United States Patent
Kucherov et al.

(10) Patent No.: US 11,216,388 B2
(45) Date of Patent: Jan. 4, 2022

(54) TIERING BETWEEN STORAGE MEDIA IN A CONTENT AWARE STORAGE SYSTEM

(71) Applicant: EMC IP Holding Company LLC, Hopkinton, MA (US)

(72) Inventors: Anton Kucherov, Dudley, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 16/398,595

(22) Filed: Apr. 30, 2019

(65) Prior Publication Data

US 2020/0349087 A1  Nov. 5, 2020

(51) Int. Cl.
*G06F 12/12* (2016.01)
*G06F 3/06* (2006.01)
*G06F 12/123* (2016.01)

(52) U.S. Cl.
CPC ............ *G06F 12/124* (2013.01); *G06F 3/065* (2013.01); *G06F 3/0608* (2013.01); *G06F 3/0652* (2013.01); *G06F 3/0659* (2013.01); *G06F 3/0685* (2013.01); *G06F 2212/1044* (2013.01)

(58) Field of Classification Search
CPC ...... G06F 12/124; G06F 3/065; G06F 3/0659; G06F 3/0652; G06F 3/0685; G06F 3/0608; G06F 2212/1044
See application file for complete search history.

(56) References Cited

U.S. PATENT DOCUMENTS

| | | |
|---|---|---|
| 6,496,908 B1 | 12/2002 | Kamvysselis et al. |
| 6,553,464 B1 | 4/2003 | Kamvysselis et al. |
| 6,640,280 B1 | 10/2003 | Kamvysselis et al. |
| 6,862,632 B1 | 3/2005 | Halstead et al. |
| 6,883,018 B1 | 4/2005 | Meiri et al. |
| 6,886,164 B2 | 4/2005 | Meiri |
| 6,898,685 B2 | 5/2005 | Meiri et al. |
| 6,910,075 B2 | 6/2005 | Marshak et al. |
| 6,938,122 B2 | 8/2005 | Meiri et al. |
| 6,944,726 B2 | 9/2005 | Yoder et al. |
| 6,968,369 B2 | 11/2005 | Veprinsky et al. |
| 6,976,139 B2 | 12/2005 | Halstead et al. |

(Continued)

OTHER PUBLICATIONS

U.S. Appl. No. 15/656,168, filed Jul. 21, 2017, Hu et al.

(Continued)

*Primary Examiner* — Masud K Khan
(74) *Attorney, Agent, or Firm* — Daly, Crowley, Mofford & Durkee, LLP

(57) ABSTRACT

Tiering data between storage media in a content aware storage system is provided. An aspect includes, for each metadata page (MP) of a plurality of MPs: storing a first copy of the MP in a high tier storage, a second copy in an intermediate tier storage, and a third copy in low tier storage. Upon determining, in response to monitoring available space in the high tier storage, usage of the high tier storage exceeds a threshold value, an aspect includes identifying a least recently used (LRU) MP, deleting the LRU MP from the high tier storage, and destaging active entries of a metadata journal for the LRU MP. An aspect further includes receiving a request to read one of the plurality of MPs and, upon determining one of the MPs is the LRU metadata page, an aspect includes reading MP from the intermediate tier storage.

20 Claims, 10 Drawing Sheets

(56) References Cited

U.S. PATENT DOCUMENTS

| | | | |
|---|---|---|---|
| 7,000,086 B2 | 2/2006 | Meiri et al. |
| 7,024,525 B2 | 4/2006 | Yoder et al. |
| 7,032,228 B1 | 4/2006 | McGillis et al. |
| 7,051,176 B2 | 5/2006 | Meiri et al. |
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,475,124 B2 | 1/2009 | Jiang et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,327,103 B1 | 12/2012 | Can et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,380,928 B1 | 2/2013 | Chen et al. |
| 8,429,346 B1 | 4/2013 | Chen et al. |
| 8,468,180 B1 | 6/2013 | Meiri et al. |
| 8,515,911 B1 | 8/2013 | Zhou et al. |
| 8,539,148 B1 | 9/2013 | Chen et al. |
| 8,566,483 B1 | 10/2013 | Chen et al. |
| 8,578,204 B1 | 11/2013 | Ortenberg et al. |
| 8,583,607 B1 | 11/2013 | Chen et al. |
| 8,600,943 B1 | 12/2013 | Fitzgerald et al. |
| 8,677,087 B2 | 3/2014 | Meiri et al. |
| 8,683,153 B1 | 3/2014 | Long et al. |
| 8,694,700 B1 | 4/2014 | Natanzon et al. |
| 8,706,959 B1 | 4/2014 | Arnon et al. |
| 8,712,976 B1 | 4/2014 | Chen et al. |
| 8,713,270 B2 | 4/2014 | Havewala et al. |
| 8,719,497 B1 | 5/2014 | Don et al. |
| 8,732,124 B1 | 5/2014 | Arnon et al. |
| 8,775,388 B1 | 7/2014 | Chen et al. |
| 8,782,324 B1 | 7/2014 | Chen et al. |
| 8,782,357 B2 | 7/2014 | Halstead et al. |
| 8,799,601 B1 | 8/2014 | Chen et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,909,887 B1 | 12/2014 | Armangau et al. |
| 8,914,596 B2 | 12/2014 | Lecrone et al. |
| 8,930,746 B1 | 1/2015 | Chen et al. |
| 8,966,211 B1 | 2/2015 | Arnon et al. |
| 8,977,812 B1 | 3/2015 | Chen et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,152,336 B1 | 10/2015 | Chen et al. |
| 9,208,162 B1 | 12/2015 | Hallak et al. |
| 9,304,889 B1 | 4/2016 | Chen et al. |
| 9,311,333 B1 | 4/2016 | Pawar et al. |
| 9,323,750 B2 | 4/2016 | Natanzon et al. |
| 9,342,465 B1 | 5/2016 | Meiri |
| 9,355,112 B1 | 5/2016 | Armangau et al. |
| 9,378,106 B1 | 6/2016 | Ben-Moshe et al. |
| 9,384,206 B1 | 7/2016 | Bono et al. |
| 9,395,937 B1 | 7/2016 | Si et al. |
| 9,396,243 B1 | 7/2016 | Halevi et al. |
| 9,418,131 B1 | 8/2016 | Halevi et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,483,355 B1 | 11/2016 | Meiri et al. |
| 9,513,814 B1 | 12/2016 | Can et al. |
| 9,524,220 B1 | 12/2016 | Veprinsky et al. |
| 9,529,545 B1 | 12/2016 | Bono et al. |
| 9,542,125 B1 | 1/2017 | Chen |
| 9,558,083 B2 | 1/2017 | LeCrone et al. |
| 9,594,514 B1 | 3/2017 | Bono et al. |
| 9,606,739 B1 | 3/2017 | LeCrone et al. |
| 9,606,870 B1 | 3/2017 | Meiri et al. |
| 9,665,305 B1 * | 5/2017 | Natanzon ............... G06F 3/0608 |
| 9,684,593 B1 | 6/2017 | Chen et al. |
| 9,710,187 B1 | 7/2017 | Si et al. |
| 9,753,663 B1 | 9/2017 | LeCrone et al. |
| 9,811,288 B1 | 11/2017 | Chen et al. |
| 9,817,766 B1 | 11/2017 | Si et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,037,369 B1 | 7/2018 | Bono et al. |
| 10,055,161 B1 | 8/2018 | Meiri et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,152,527 B1 | 12/2018 | Meiri et al. |
| 10,176,046 B1 | 1/2019 | Hu et al. |
| 10,235,066 B1 | 3/2019 | Chen et al. |
| 10,238,487 B2 | 3/2019 | Alon et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,851 B1 | 7/2019 | Kronrod et al. |
| 10,353,616 B1 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,459,883 B1 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 10,606,670 B2 | 3/2020 | Zhao et al. |
| 2011/0231596 A1 * | 9/2011 | Goss ................... G06F 12/0246 711/103 |
| 2013/0024600 A1 | 1/2013 | Wakrat et al. |
| 2013/0204961 A1 * | 8/2013 | Fliam ..................... G06F 3/061 709/214 |
| 2014/0089264 A1 | 3/2014 | Talagala et al. |
| 2014/0149664 A1 | 5/2014 | Ezra et al. |
| 2014/0250155 A1 * | 9/2014 | Chen ................... G06F 16/1847 707/823 |
| 2014/0337562 A1 | 11/2014 | Long et al. |
| 2016/0335134 A1 * | 11/2016 | Gupta ................... G06F 9/5033 |
| 2018/0011893 A1 | 1/2018 | Kimura |
| 2018/0137014 A1 | 5/2018 | Li et al. |
| 2018/0203614 A1 * | 7/2018 | Aronovich ............ G06F 3/0647 |
| 2018/0276392 A1 | 9/2018 | Hoogerbrugge et al. |

OTHER PUBLICATIONS

Response to U.S. Non-Final Office Action dated Mar. 30, 2020 for U.S. Appl. No. 15/656,168; Response filed May 4, 2020; 24 Pages.

(56) References Cited

OTHER PUBLICATIONS

U.S. Notice of Allowance dated May 12, 2020 for U.S. Appl. No. 15/656,168; 10 Pages.
Final Office Action dated Sep. 26, 2019 for U.S. Appl. No. 15/656,170; 17 Pages.
RCE and Response to U.S. Final Office Action dated Sep. 26, 2019 for U.S. Appl. No. 15/656,170; RCE and Response filed Feb. 24, 2020; 23 Pages.
U.S. Non-Final Office Action dated Aug. 13, 2020 for U.S. Appl. No. 15/656,170; 18 Pages.
Response to U.S. Non-Final Office Action dated Aug. 13, 2020 for U.S. Appl. No. 15/656,170; Response filed Oct. 29, 2020; 18 Pages.
U.S. Appl. No. 15/001,789, filed Jan. 20, 2016, Meiri et al.
U.S. Appl. No. 15/076,946, filed Mar. 22, 2016, Meiri.
U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Strong et al.
U.S. Appl. No. 15/797,329, filed Oct. 30, 2017, Parasnis et al.
U.S. Appl. No. 15/971,153, filed May 4, 2018, Meir et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/808,943, filed Mar. 4, 2020, Parasnis et al.
U.S. Non-Final Office Action dated Mar. 30, 2020 for U.S. Appl. No. 15/656,168; 23 Pages.
U.S. Non-Final Office Action dated Feb. 26, 2019 for U.S. Appl. No. 15/656,170; 15 Pages.
Response to U.S. Non-Final Office Action dated Feb. 26, 2019 for U.S. Appl. No. 15/656,170; Response filed Jun. 25, 2019; 24 Pages.
Applicant Initiated Interview Summary dated Jun. 25, 2019 for U.S. Appl. No. 15/656,170; Interview Conducted on Jun. 19, 2019; 3 Pages.
U.S. Notice of Allowance dated Jan. 22, 2021 for U.S. Appl. No. 15/656,170; 10 Pages.
U.S. Appl. No. 15/076,775, filed Mar. 22, 2016, Chen et al.
U.S. Appl. No. 15/499,943, filed Apr. 28, 2017, Kucherov et al.
U.S. Appl. No. 15/499,935, filed Apr. 28, 2017, Chen et al.
U.S. Appl. No. 15/499,949, filed Apr. 28, 2017, Chen et al.
U.S. Appl. No. 15/499,947, filed Apr. 28, 2017, Kucherov et al.
U.S. Appl. No. 15/499,951, filed Apr. 28, 2017, Chen et al.
U.S. Appl. No. 15/656,170, filed Jul. 21, 2017, Chen et al.
U.S. Appl. No. 15/797,324, filed Oct. 30, 2017, Chen et al.
U.S. Appl. No. 15/885,027, filed Jan. 31, 2018, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/169,202, filed Oct. 24, 2018, Chen et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/375,001, filed Apr. 4, 2019, Chen et al.
U.S. Appl. No. 16/380,087, filed Apr. 10, 2019, Kronrod et al.
U.S. Appl. No. 16/511,676, filed Jul. 15, 2019, Chen et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.

\* cited by examiner

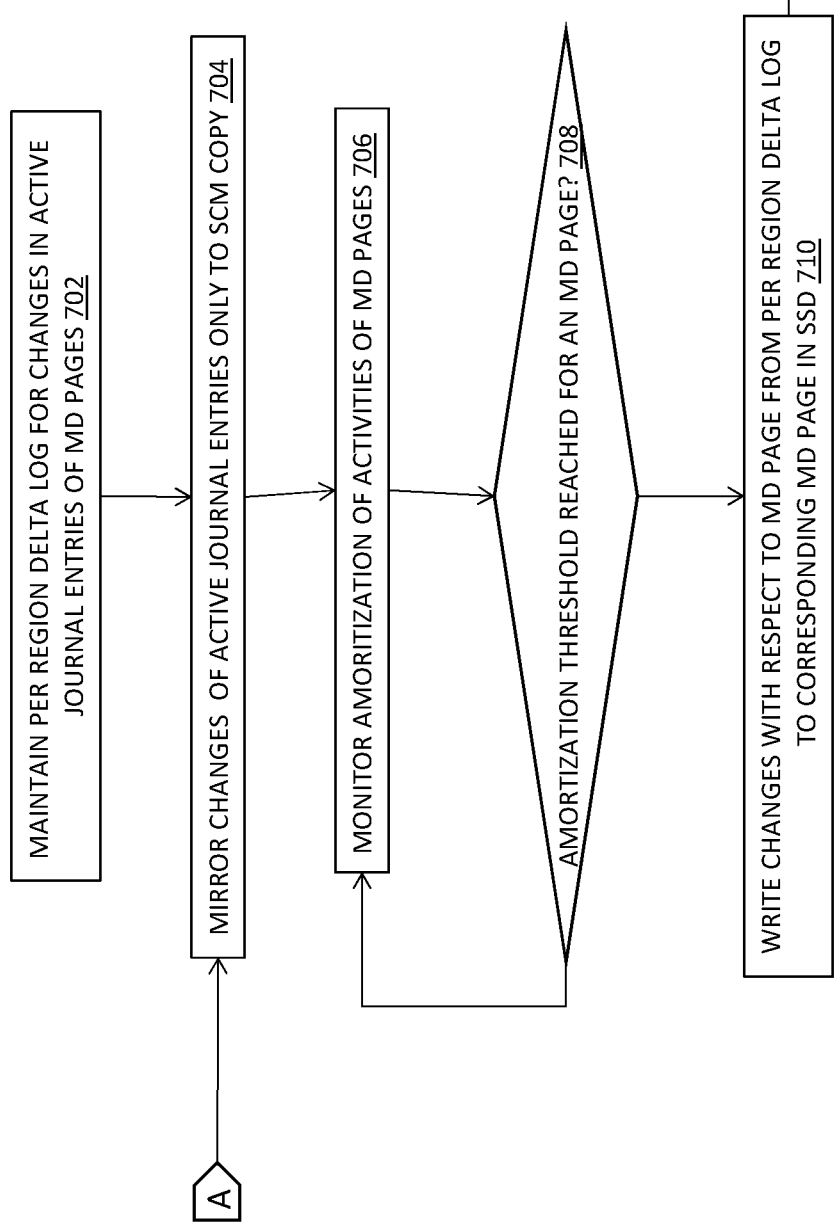

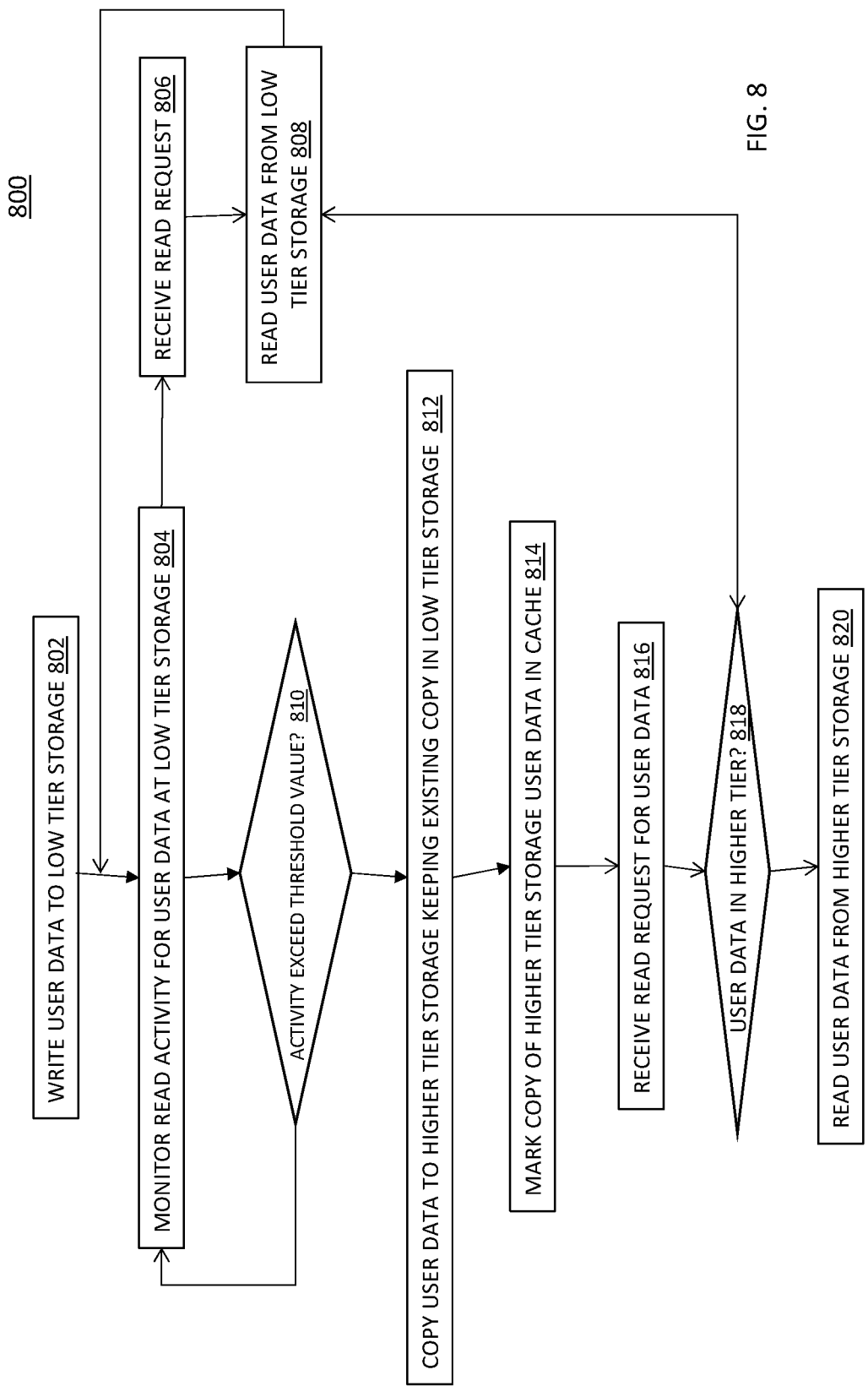

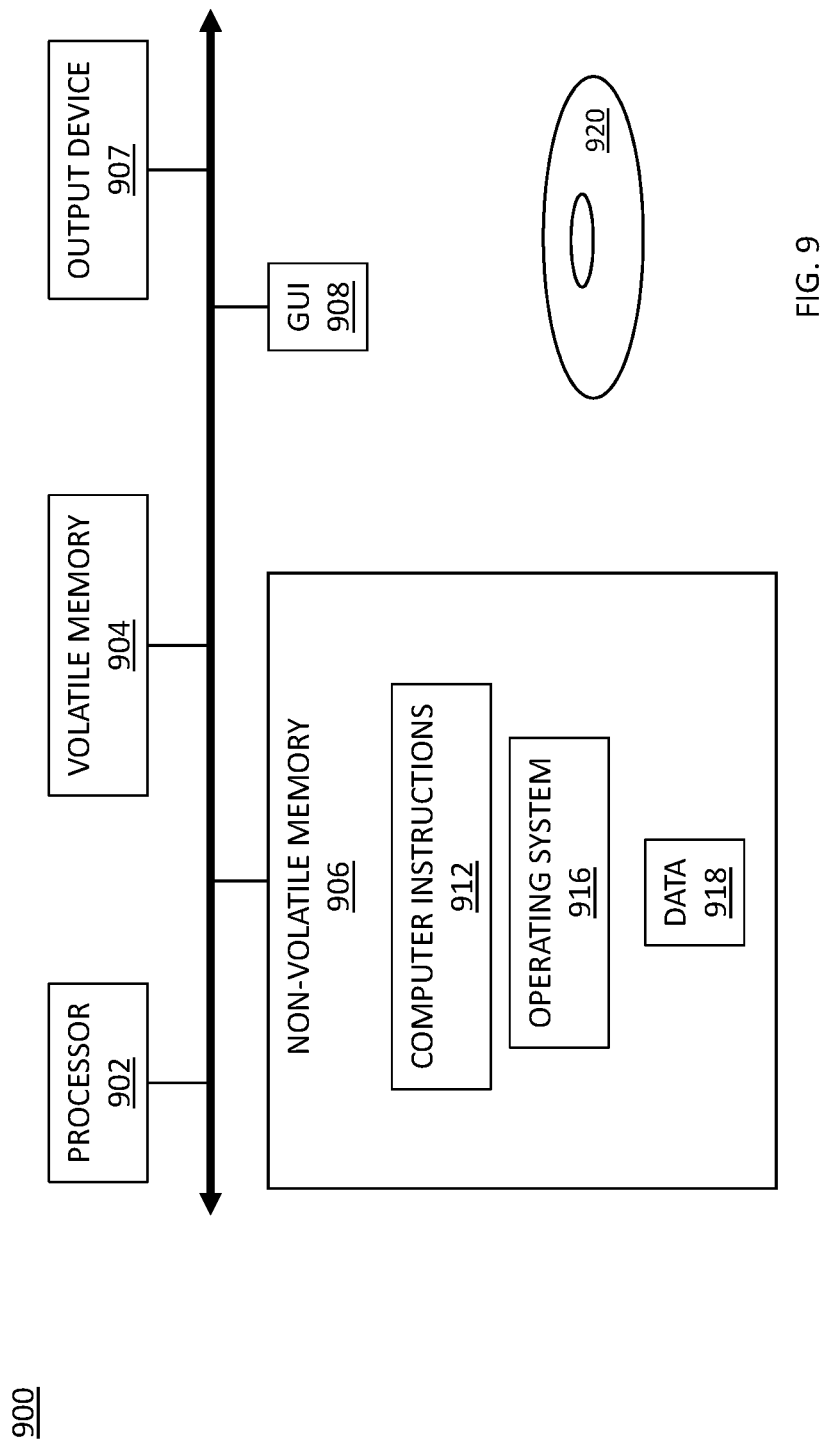

TIERING BETWEEN STORAGE MEDIA IN A CONTENT AWARE STORAGE SYSTEM

BACKGROUND

Computer data is vital to today's organizations, and content addressable (also referred to as content aware) storage systems (such as DELL EMC XTREMIO) (hereinafter "XtremIO") can support a rich set of advanced data services such as single data instance, compression, snapshots, etc., by decoupling storage access, logical volume address space, and physical on-disk location of data. In systems such as this, volume and physical layout metadata can offer tremendous flexibility in decoupling and virtualization.

In large-scale network environments where high volume processing is performed, there is a need to provide high-speed data processing while minimizing costs associated therewith. There is also a need to provide efficient, cost-effective storage systems and techniques that preserve data integrity and ensure availability of critical system components, such as data systems and file systems. To protect against data loss as result of data corruption, file system corruption, and/or hardware failure, storage systems frequently use one or more protection strategies, such as redundant storage. However, maintaining multiple copies of data on disparate storage systems can add to overall costs of storage.

SUMMARY

This Summary is provided to introduce a selection of concepts in a simplified form that are further described herein in the Detailed Description. This Summary is not intended to identify key features or essential features of the claimed subject matter, nor is it intended to be used to limit the scope of the claimed subject matter.

One aspect may provide a method to provide tiering of data between storage media in a content aware storage system. The method includes, for each metadata page of a plurality of metadata pages in the content aware storage system: storing a first copy of the metadata page in a high tier storage, storing a second copy of the metadata page in an intermediate tier storage, and storing a third copy of the metadata page in low tier storage. Upon determining, in response to monitoring available space in the high tier storage, that usage of the high tier storage exceeds a threshold value, the method includes identifying a least recently used (LRU) metadata page of the plurality of metadata pages, deleting the LRU metadata page from the high tier storage, and destaging active entries of a metadata journal for the LRU metadata page. The method also includes receiving a request to read one of the plurality of metadata pages. Upon determining the one of the plurality of metadata pages is the LRU metadata page, the method includes reading the one of the plurality of metadata pages from the intermediate tier storage.

Another aspect may provide a system for providing tiering of data between storage media in a content aware storage system. The system includes a memory having computer-executable instructions. The system also includes a processor operated by a storage system. The processor executes the computer-executable instructions. When executed by the processor, the computer-executable instructions cause the processor to perform operations. The operations include, for each metadata page of a plurality of metadata pages in the content aware storage system: storing a first copy of the metadata page in a high tier storage, storing a second copy of the metadata page in an intermediate tier storage, and storing a third copy of the metadata page in low tier storage. Upon determining, in response to monitoring available space in the high tier storage, that usage of the high tier storage exceeds a threshold value, the operations include identifying a least recently used (LRU) metadata page of the plurality of metadata pages, deleting the LRU metadata page from the high tier storage, and destaging active entries of a metadata journal for the LRU metadata page. The operations also include receiving a request to read one of the plurality of metadata pages. Upon determining the one of the plurality of metadata pages is the LRU metadata page, the operations include reading the one of the plurality of metadata pages from the intermediate tier storage.

Another aspect may provide a computer program product for tiering of data between storage media in a content aware storage system. The computer program product is embodied on a non-transitory computer readable medium. The computer program product includes instructions that, when executed by a computer at a storage system, causes the computer to perform operations. The operations include, for each metadata page of a plurality of metadata pages in the content aware storage system: storing a first copy of the metadata page in a high tier storage, storing a second copy of the metadata page in an intermediate tier storage, and storing a third copy of the metadata page in low tier storage. Upon determining, in response to monitoring available space in the high tier storage, that usage of the high tier storage exceeds a threshold value, the operations include identifying a least recently used (LRU) metadata page of the plurality of metadata pages, deleting the LRU metadata page from the high tier storage, and destaging active entries of a metadata journal for the LRU metadata page. The operations also include receiving a request to read one of the plurality of metadata pages. Upon determining the one of the plurality of metadata pages is the LRU metadata page, the operations include reading the one of the plurality of metadata pages from the intermediate tier storage.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

FIG. 7 is a flow diagram of a process for providing tiering of data between storage media in a content aware storage system in accordance with another embodiment;

FIG. 8 is a flow diagram of a process for providing tiering of data between storage media in a content aware storage system in accordance with a further embodiment; and FIG. 9 is a block diagram of an illustrative computer that can perform at least a portion of the processing described herein.

DETAILED DESCRIPTION

Figure 1A:
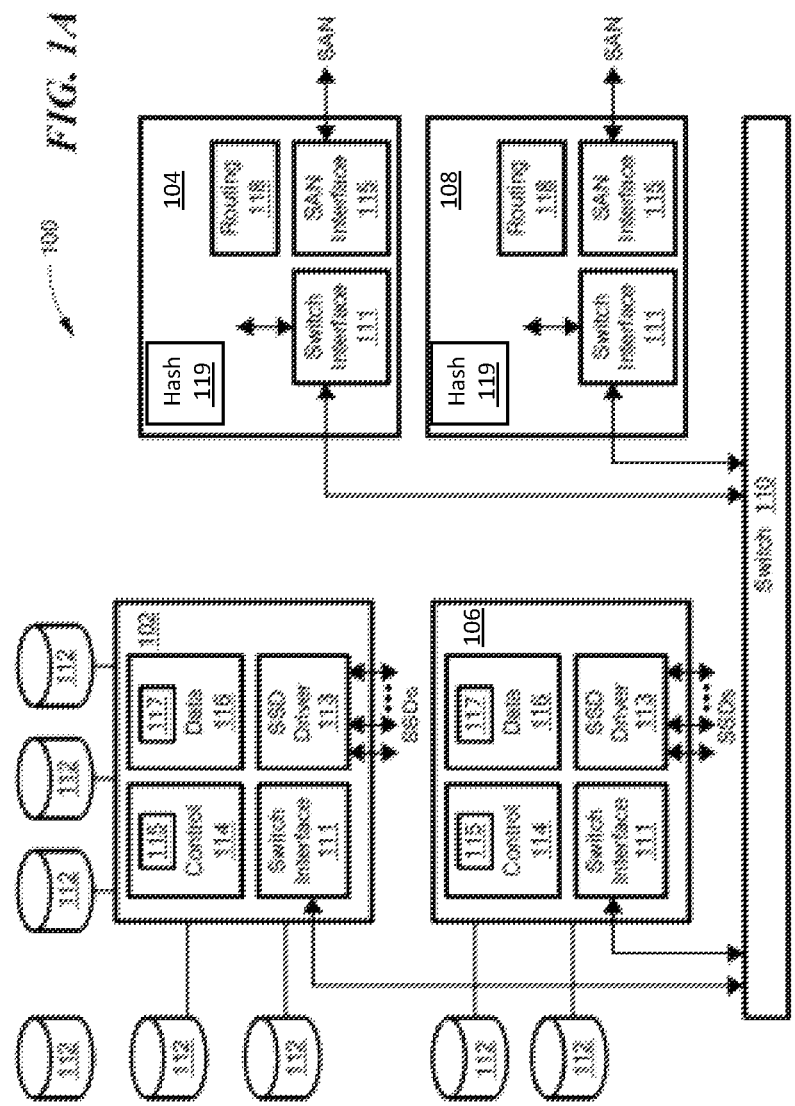
FIG. 1A is a block diagram of a content aware storage system having multi-level cache in accordance with an embodiment.

Embodiments described herein provide tiering of data between storage media in a content aware storage system. In the course of input/output (IO) processes, the embodiments described herein provide efficiencies in storage of IO data in terms of tiering between storage media based on factors, such as available high-tier memory and data access frequency. In all flash content aware storage arrays there is a high degree of distribution of data. The embodiments described herein focus on techniques to leverage the low latency associated with intermediate tier storage, such as storage class memory (SCM), and the high degree of writes per day to lower the cost of all flash arrays by lowering the need for costly high tier storage, such as RAM, thereby allowing a system to provide less expensive, lower writes per day (WPD) for the arrays (e.g., by lowering the need for RAM and allowing for the use of less expensive, lower WPD for the storage backend).

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium.

In certain embodiments, the term "JO request" or simply "IO" may be used to refer to an input or output request, such as a data read or data write request.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. In certain embodiments, a data storage entity may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines.

In certain embodiments, a physical storage unit may be a physical entity, such as a disk or an array of disks, for storing data in storage locations that can be accessed by address, where physical storage unit is used interchangeably with physical volume. In certain embodiments, a data storage entity may be any one or more of a file system, object storage, a virtualized device, a logical unit, a logical unit number, a logical volume, a logical device, a physical device, and/or a storage medium.

In certain embodiments, a snapshot may refer to differential representations of an image, i.e. the snapshot may have pointers to the original volume and may point to log volumes for changed locations. In certain embodiments, a snapshot may refer to differential representations of the state of a system. Snapshots may be combined into a snapshot array, which may represent different images over a time period or different states of a system over a time period.

In certain embodiments, a journal may be a record of write transactions (e.g., IO data) issued to a storage system, which may be used to maintain a duplicate storage system, and to roll back the duplicate storage system to a previous point in time. In some embodiments, each entry in a journal contains, apart from the IO data itself, IO metadata that can include information such as a volume identifier (ID), the IO block offset within the volume, the IO length, and a time stamp of the IO.

In certain embodiments, XtremIO, available from Dell EMC of Hopkinton, Mass.) is a type of content addressable storage array that uses all flash technology. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data protection strategy that can be advantageous for use with computer systems, especially networked storage systems, is checkpointing. A checkpoint, as used herein, contains a consistent point in time image of an entire system, including configuration, logical volume mapping metadata, physical on disk layout metadata, and actual user data. In certain embodiments, a checkpoint preserves the state of a system at a given point in time by saving one or more snapshots of, for example, a file system, or an application at one or more points in time. A checkpoint can preserve a snapshot of an application's state, so that it can restart from that point in case of failure, which can be useful for long running applications that are executed in failure-prone computing systems. If a checkpoint is used, an application periodically writes large volumes of snapshot data to persistent storage in an attempt to capture its current state. Thus, if there is a failure, the application can recover by rolling-back its execution state to a previously saved checkpoint.

In certain embodiments, a "checkpoint" refers at least to an entity created by a checkpoint process, where the checkpoint process performs actions to preserve the state of an apparatus, system, or other entity (including software entities) at a particular time. Advantageously, a checkpoint includes information such as user data, the configuration of the apparatus, user metadata, and other information related to the internal state of the apparatus or system. For example, some storage systems (including XtremIO), in accordance with certain embodiments herein, also provide some kind of checkpoint feature, to provide an ability to preserve system state including user data and metadata at some defined point in time in order to restore this state after system malfunction or corruption. In certain embodiments, the checkpoint corresponds to a frozen, immutable re representation of the state of a system or apparatus at certain point in time, including user data, metadata, and the system configuration. In certain embodiments, the checkpoint is stored in a dedicated, reserved location within the system. In certain embodiments, the checkpoint is able to be created in an online, dynamic environment, where the checkpoint creation is transparent to entities having JO interactions with the system.

For a file system, the accuracy and consistency of a file system is necessary to relate applications and data, so a checkpoint provides a way to provide periodic backup of file server state to allow system recovery in the event of faults or failures. When data corruption is detected, one of the checkpoints can be used for file system recovery. Similarly, a checkpoint, in a virtualization context, is a snapshot of the state of a virtual machine. Like a restore point in MICROSOFT WINDOWS operating systems, a checkpoint allows an administrator to restore an entity (e.g., a computer system, a file system, an application, a virtual machine, etc.) to a previous state. Checkpoints also can be used to create backups before conducting updates. Should an update fail or cause problems, an administrator can return the virtual machine to its state prior to the update. A recover action is used to return the system to the checkpoint state.

In an exemplary Content Addressable Storage (CAS) array (e.g., as described in U.S. Pat. No. 9,208,162 (hereinafter "162 patent"), which is hereby incorporated by reference), data is stored in blocks, for example of 4 KB, where each block has a unique large hash signature, for example of 20 bytes, saved on Flash memory. In certain embodiments, a long hash is a value computed based on a data packet, such as a SHA-1 hash that is 20 bytes in length, but this is not limiting. As described herein, hash signatures (also referred to herein as full hashes or long hashes) are accessed by small in-memory handles (called herein, interchangeably, hash handles, short hash handles or short hashes)), for example of 6 bytes. These handles are unique to each array, but not necessarily unique across arrays. A hash signature is unique, meaning that if two hash signatures are the same then their corresponding data blocks are the same. In certain embodiments, a hash signature may be represented by a short hash generated by using, for example, processes shown in FIG. 12A of the '162 patent. Short hashes are not necessarily world-wide unique, but in certain embodiments short hashes can be unique within a domain. In certain embodiments, the long hash can be computed or determined based on the short hash, using, for example, processes shown in FIG. 12C of the '162 patent.

In embodiments, a storage class memory (SCM) refers to a hybrid storage/memory tier that is slightly lower than DRAM but is persistent like traditional storage. SCM is typically much faster and more resilient than flash memory. SCM is also denser and less expensive than DRAM.

In certain embodiments, tiering refers to moving and/or copying data that resides on one media type at a given time to another media as data access patterns change.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

FIG. 1A shows an illustrative content-based data storage system 100 with deduplication that may have multi-level data caches in accordance with embodiments of the disclosure. The content-based data storage system 100 is also referred to a content-addressable storage system or content-aware storage system. In the illustrated embodiment, first, second, third, and fourth nodes 102, 104, 106, 108 can be interconnected by a switch 110 via a switch interface 111. The first node 102 can include a control system 114 and a data system 116. In embodiments, separate data and control planes may be provided by the control and data systems 114, 116. The control system 114 may control execution of read and write commands to the storage devices 112. The data systems 116 may be connected to the storage devices 112 and, under control of a respective control system 114, may pass data to and/or from the storage devices via suitable storage drivers 113.

The data and/or control systems 114, 116 may retain extracts of the data stored in the storage devices 112. In embodiments, the data extracts may be generated by cryptographic hashing of the data content in the data blocks. In embodiments, the extracts may be used for content addressing of the data blocks to the physical storage devices 112.

The second node 104 can include a hash system 119 to generate the hash/extract, which can be referred to as a content fingerprint for the data blocks. The second node 104 can also include a routing system 118, along with a switch interface 111 and a SAN interface 115. The routing system 118 may terminate storage and retrieval operations and distribute commands to control systems 114 that may be selected for the operation in such a way as to retain balanced usage within the system. In the illustrated embodiment, the third node 106 can be similar to the first node 102 and the fourth node 108 can be similar to the second node 104.

The routing systems 118 may use the hash values calculated from data blocks to select control systems 114 for distribution. More particularly, selection of the control system 114 may use hash values or may rely on the user address and not on the content (hash). The hash value may, however, be used for selecting the data system 116, and for setting the physical location for data storage within the data system.

In example embodiments, control modules 114 (also referred to as "C-Modules") can include a C cache 115 and the data modules 116 (also referred to as "D-Modules") can include a D cache 117. As explained more fully below, the C cache 115 can include addresses and address hashes, and the D cache 117 can include, for each bucket, physical data location information, a filter, a hash to physical location, and bucket information. The control modules may be referred to as a logical layer, holds the metadata for the logical layer, and implements the volume/snapshot operations. The data module manages the SSDs and implements one or more RAID algorithms as described further herein.

In some examples, the system 100 may employ more than a single type of memory technology, including a mix of more than one Flash technology (e.g., single level cell (SLC) flash and multilevel cell (MLC) flash), and a mix of Flash and DRAM technologies. In certain embodiments, data mapping may optimize performance and life span by taking advantage of the different access speeds and different write/erase cycle limitations of the various memory technologies.

Figure 1B:
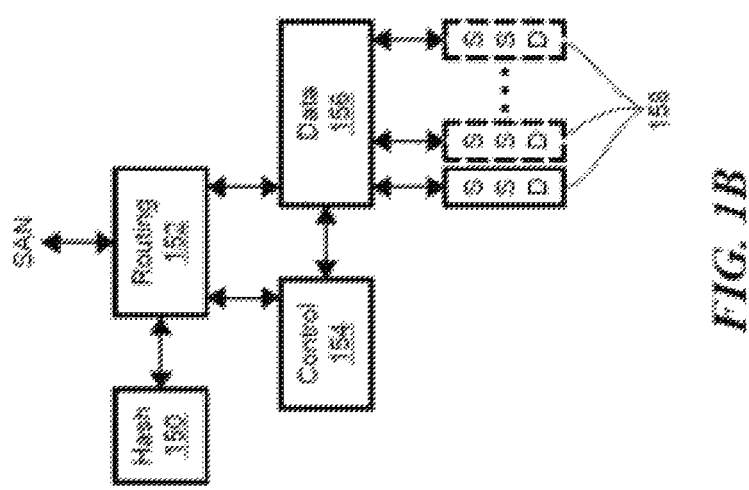
FIG. 1B illustrates further detail of the system of FIG. 1A.

FIG. 1B is an example of a system that can include a hash (H) system 150 communicatively coupled to a routing (R) system 152, which can be communicatively coupled to a control (C) system 154 and a data (D) system 156. The data system 156 can be communicatively coupled to any practical number of memory devices 158. The routing system 152 can route read/write commands from a host (not shown) to control and data systems 154, 156 for execution. In embodiments, the data content-based mapping to physical storage 158 can distribute workload relatively evenly and provide separation of the control and data paths. Read and write operations to the SSDs 158 can be used to generate priority values for the data blocks, as described more fully below.

A function of the H module 150 is to calculate the Hash function value for a given block of data, e.g., data which is the subject of storage commands. The hash values calculated may later be used for retrieval. The Hash function may be based on standards based hash functions such as SHA-1 and MD5, or based on a proprietary function, but this is not limiting. The hash function is selected, in certain embodiments, to generate a uniformly distributed output over the range of potential input values. In certain embodiments, H modules 150 share nodes with an R module 152, but that is not limiting. More generally, the H modules 150 can reside in certain nodes, in all nodes, together with R modules 152, or together with C modules 154 or D modules 156.

A responsibility of the R module 152 is to terminate storage area network (SAN) Read/Write commands and route them to appropriate C and D modules 154 and 156, for execution by these modules. By doing so, the R module 152 can distribute workload over multiple C and D modules 154, 156, and at the same time create complete separation of the Control and Data planes, that is to say provide separate control and data paths. In certain embodiments, the R module 152 routes SCSI IO request to the C modules 154, guarantees execution, and returns the result. In certain embodiments, the R module 152 maintains an up to date data structure called an address-to-control module (A→C or A2C) table, coordinated with the management back end (MBD), indicating which C module 154 is responsible for each logical X-page address (LXA), and also showing a balance a range of all possible LXAs between available C modules 154. In certain embodiments, for write operations, the R module 152 instructs the calculation of a hash digest for each X-page by requesting such calculation from a hash calculation module (e.g., the H module 150).

A function of the C module 154 is to control the execution of a Read/Write (R/W) command, as well as other storage functions implemented by the system. The C module 154 also may maintain and manage key metadata elements. In certain embodiments, the C module 154 receives an IO request from an R module 152 on a certain sub-LUN (SL), guaranteeing its atomic execution (i.e., execution independent of other processes) and returns the result to the R module 152. The C module 154 also communicates with D modules 156 to execute the IO requests. In addition, the C module 154 monitors the disk content of its logical space by associating each LXA with its hash digest; and balances the work load between the D modules for the SLs that the C module 154 is maintaining. The C module 154 and data module 156 each maintains certain data structures and corresponding metadata journals for those data structures. For example, the C module 154 maintains an "address to hash" table (A2H table, also referred to herein as A→H table) and corresponding A2H metadata journal, in the C module 154. The D module 156 maintains the "hash to physical location of data" table (H2P table, also referred to herein as H→P table) and its corresponding metadata journal in the D module 156. That is, in certain embodiments, the in-memory copy of a journal is in the same module as the corresponding metadata table. In certain embodiments, the on-disk journal copy is persisted and mirrored across nodes in the cluster in journal disk chunks.

The A2H table maps each LXA that belongs to the SLs that the C module 154 is responsible for, to the hash digest representing the X-page Data that currently resides in that address. The C module 154 maintains an A2H table in a persistent way. The C module 154 may initiate requests to D modules 156 in order to save table pages to disk and read them from disk. In addition, to avoid frequent disk operations, the C module 154 maintains a journal certain of the latest table operations. These journals include (but are not limited to) the A2H metadata journals (A2H Hash tree) and dirty tree update metadata journals. The dirty tree and corresponding functionality are described further in commonly assigned U.S. patent application Ser. No. 15/656,168 entitled "Online Metadata Backup Consistency Check," filed on Jul. 21, 2017, which is hereby incorporated by reference.

The data module (D) takes charge of Hash Metadata (HMD), physical layout (PL) metadata, hash to physical layout (H2P) mapping, H2P metadata journals, on disk block allocation (3WBM) and disk block allocation bitmap (3WBM) journals. For example, in certain embodiments, the metadata journals include information associated with time-based changes to information in the respective A2H and H2P tables and time-based changes to the disk block allocation bitmap.

The H2P table maps each range of hash digests to the corresponding D module 156 responsible for that range. The H2P table balances the range of all possible hash digests between the available D modules 156.

A function of the D module 156 is to perform the actual read/write (R/W) operation by accessing the storage devices 158 attached to it. The D module 156 may maintain metadata related with the physical location of data blocks. In certain embodiments, the D module 156 is responsible for: maintaining a set of LUNs which are attached locally and performing all IO operations on these LUN; managing the physical layout of the attached LUNs; managing the mapping between X-Page Data hash digests and their physical location in a persistent way; managing deduplication of X-Page Data in a persistent way; and receiving disk IO requests from C modules 154, perform them and returning a result.

In certain embodiments, the D module 156 is also responsible for, for each write operation, backing up the X-Page Data in the designated D backup module and performing read-modify operations for writes that are smaller than X-Page size (This process also involves, in certain embodiments, computing a hash digest for these X-Pages). In certain embodiments, the D module 156 maintains an up-to-date H→(D, $D_{backup}$) table coordinated with the MBE, where the H→(D, $D_{backup}$), table is expected to balance the range of all possible hash digests between the available D modules 156.

Balancing between the D modules is based on hashing of the content. For example, in certain embodiments, the D module 156 makes use of a hash digest metadata table. The hash digest metadata table maps each in use hash digest, that represents actual X-Page Data, to its meta data information including its physical page on the storage media (SSD), its memory copy (if exists), a mapping to any backup memory copy and a reference count for the purpose of deduplication. The D modules 156 manage a separate nonvolatile memory pool (NVRAM or UPS protected) for X-Page Data backup purposes. The backup holds X-Pages that are held in memory of the D primary and have not yet been destaged. This is an example of the user data destage cache (UDC). There are dirty X-pages waiting to be persisted on disk. When re-balancing between D modules 156 occurs (due to a D module 156 failure for example), the D module 156 may communicate with other D modules 156 in order to create new backup copies or move a primary ownership as required.

The D modules 156 allow deduplication per X-Page Data by maintaining a persistent reference count that guarantees only one copy per X-Page Data. The D modules 156 manage the hash digest metadata table in a persistent way. The table is coordinated with the physical layout for physical pages allocation, with the memory pointer, memory backup pointer, and deduplication reference count.

As will be appreciated, the R, C, D, and H modules 150-156 may be implemented in software, and executed on a physical node. In addition, the aforementioned '326 patent provides information relating to additional functionality of the R, C, D, and H modules 150-156, in certain embodiments.

Figure 2:
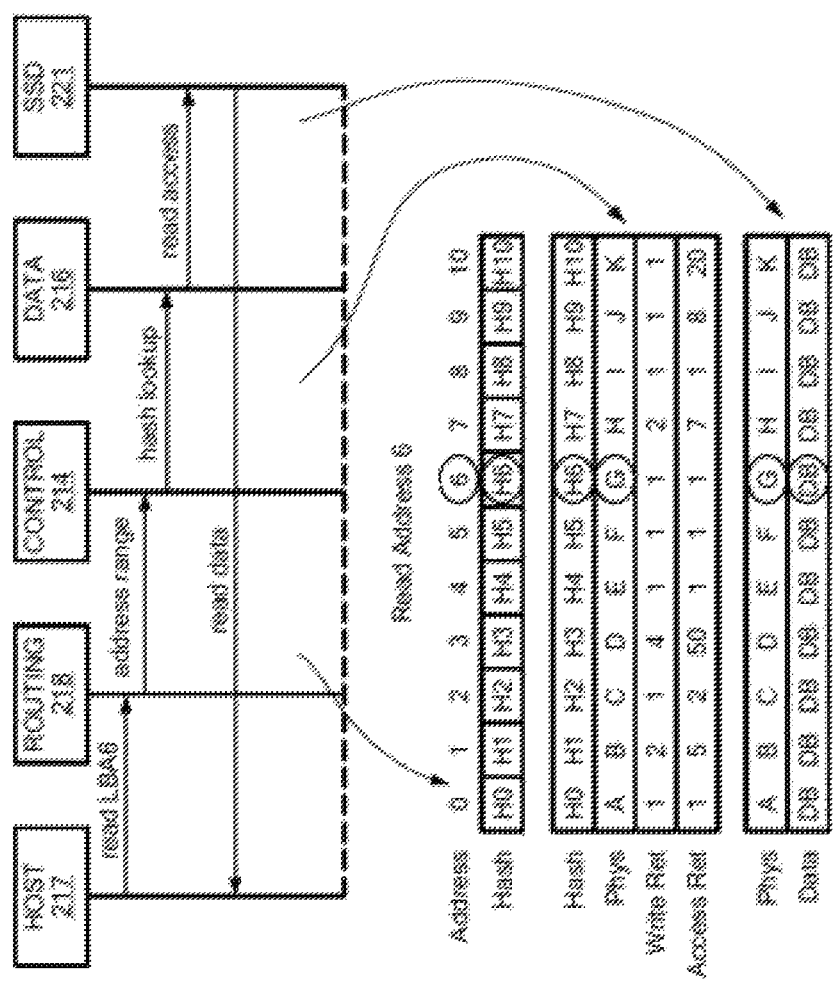
FIG. 2 is a flow diagram of read and write operations for the system of FIG. 1A.

FIG. 2 shows an example IO operation. A host 217 may issue a read command for a logical block address, which is shown as address "6," via a Fibre Channel or iSCSI port, for example. The routing system 218 may receive the read command and determine a requested address range in data blocks of 4K, for example, and pass the address information to the control system 214. The control system 214 may look up address 6 to obtain the hash value, which is shown as H6. This may be referred to as address-to-hash (A2H) lookup. The H6 hash value may be passed to the data system 216 which can perform a look up of the H6 hash value in a hash-to-physical address (H2P) table to read the physical address for the data. In the example, the physical address is shown as "G." The data system 216 can use the physical address to read the data block (DB) at physical address G in the SSD 221. A reference count can correspond to a number of times the hash value is referenced in physical storage. In embodiments, write reference information can be modified for each unique and/or deduplicated write and access reference information can be modified for each read and/or write access.

For a write operation from a host, the routing system 218 can receive the write data and can segment the data stream into data blocks and generate hash values for the data blocks. The hash value can be provided to the control system 214 to determine if the write data is unique. If unique, the hash value can be placed in an address mapping. The control system 214 can pass the hash value to the data system 216, which can assign the hash value to a physical address and write the data block(s) to the SSD at the physical address. In embodiments, the write reference information and/or the access reference information, can be modified, e.g., incremented, If the hash value generated by the routing system 218 is not unique, the control system 214 can determine that data already exists at the physical address for the hash value. Since the data already exists, the data system 216 can increment the write reference information for the data block. In embodiments, the access reference information can also be modified. The data may not be written to the SSD. Deduplication may refer to a write operation where a hash for a data block is found not be unique and the non-unique data block is not written to physical storage. The reference count for the non-unique hash may be incremented.

Figure 3:
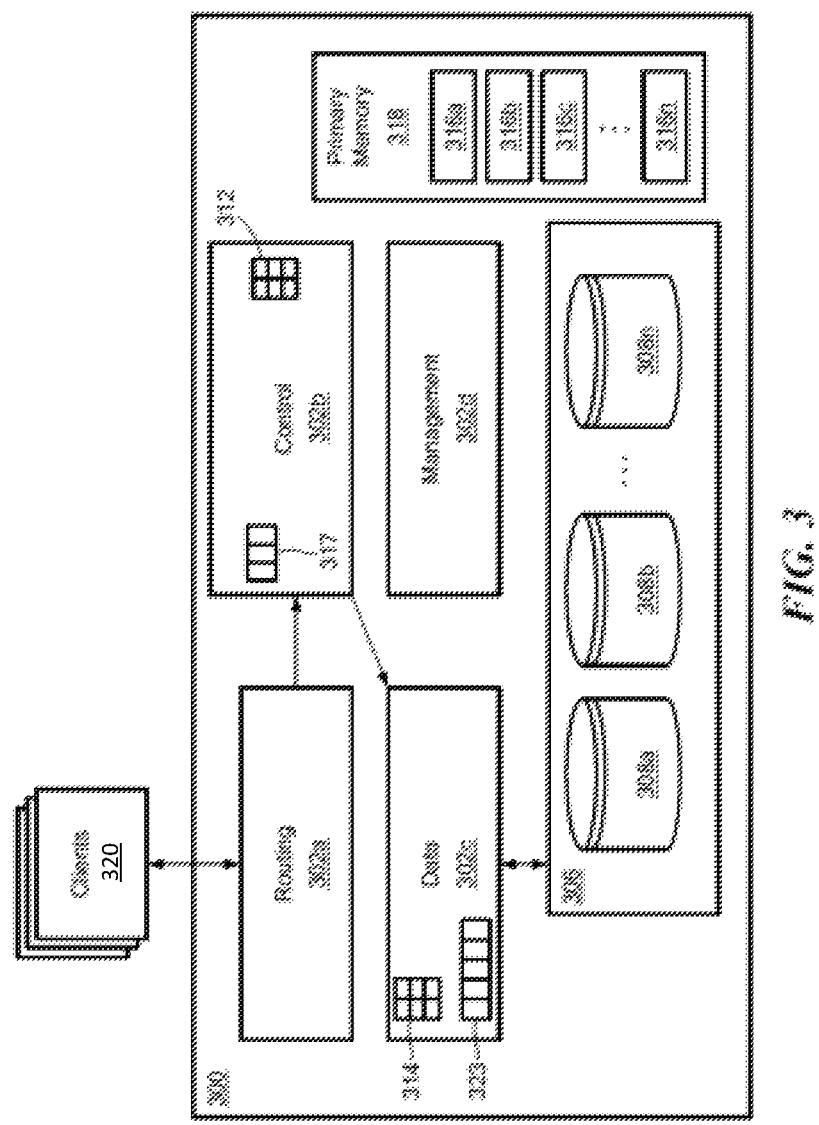
FIG. 3 is a block diagram of a content aware storage system having a control module with a first cache and a data module with a second cache.

FIG. 3 shows a storage system 300 according to an illustrative embodiment of the disclosure. The storage system 300 may be the same as or similar to a node within the distributed storage system of FIG. 1A. The storage system 300 may include a plurality of modules 302a-302d (generally denoted 302 herein), a storage array 306 comprising a plurality of storage devices 308a . . . 308n (generally denoted 308 herein), and a primary memory 318. In some embodiments, the storage devices 308 may be provided as solid-state devices (SSDs).

As described further herein, the storage system 300 also can include a C (also called logical) cache 317 and a D (also called physical) cache 323. The C cache 317 and/or the D cache 323 can, in certain embodiments, be physical devices configured to store certain data so that future requests for that data can be served faster. Although the C cache 317 and D cache 323 are shown as being part of the storage system, it is understood that the C cache 317 and/or D cache 323 can be located anywhere such that they are accessible quickly to the storage system. Data that is stored within a cache might include data values that have been computed earlier or duplicates of original values that are stored elsewhere. If the requested data is contained in the cache (herein referred to as a cache hit), this request can be served by simply reading the cache, which is comparatively faster than going to other types of memory. On the other hand, if the requested data is not contained in the cache (herein referred to as a cache miss), the data may have to be to be recomputed or fetched from its original storage location, which is comparatively slower. Hence, the greater the number of requests that can be served from the cache, the faster the overall system performance becomes.

The primary memory 318 can be any type of memory having access times that are faster compared to the storage devices 308. In some embodiments, primary memory 318 may be provided as dynamic random-access memory (DRAM). In certain embodiments, primary memory 318 may be provided as synchronous DRAM (SDRAM). In one embodiment, primary memory 318 may be provided as double data rate SDRAM (DDR SDRAM), such as DDR3 SDRAM.

As described above, the control subsystem 302b may be configured to maintain a mapping between IO addresses associated with data and the corresponding chunk hashes. As shown in FIG. 3, this mapping may be maintained using a data structure 312, referred to herein as an "IO address to chunk hash mapping table" or "A2H table," (also known as A→H table) according to some embodiments. In one embodiment, IO addresses may be logical addresses used by clients 320 to access data within the storage system 300.

As also described above, the data subsystem 302c may be configured to maintain a mapping between chunk hashes and physical storage addresses (i.e., storage locations within the storage array 306 and/or within individual storage devices 308). This mapping may be maintained using a data structure 314, referred to herein as a "hash to physical address mapping table" or "H2P table," or "H→P table," according to some embodiments, where this table, in certain embodiments, includes information similar to that of the aforementioned HMD (hash metadata) and PL (physical layout) tables. In certain embodiments, as described, for example, in the incorporated by reference patents, there also may be a mapping referred to as the H2D or H→D table, where D stands for disk physical layout. In certain embodiments, the H2P table is maintained to route data with different hashes to different D modules. The data subsystem 302c may be also be configured to read and write data from/to the storage array 306 (and/or to individual storage devices 308 therein).

As described above, in a content addressable storage system, data is stored in blocks, for example 16 KB, 8 KB, 4 KB, etc., where each block has a universally unique large hash signature, for example of 20 bytes, which can be saved to disk, e.g., Flash memory. As described herein, hash signatures may be accessed by small in-memory handles (referred to herein as short hash handles, hash handles, or short hashes), for example of 6 bytes. These short hashes may be unique to each volume/array, but not necessarily unique across volumes/arrays.

In embodiments, address to hash mapping (A2H) maps an address inside a volume to the short hash value of its data. In embodiments, metadata can include for each address the hash value of the content. If the basis for deduplication is 16 KB, then the metadata holds for each address the short hash value of the data to which the address points. In cases where access to the volume is in larger chunks than the size of the basic hash value, the metadata for the address space can be readily cached.

As also noted above, hash to physical disk locations can include for each hash key (e.g., 6 bytes) the location on the disk, and the reference count. Where a storage system uses hash keys of 6 bytes, there may be collisions of data generating the same hash. If there is a collision, a new hash key from a different hash address space is generated for the data when the data is written. This means that the hash to physical disk location table may search for a hash value every time a new write arrives. If the write has the same hash value, there is a need to check the long hash value, and verify if there is a hash collision, or whether it is actually the same data. This means that during every write if the hash to physical disk location table is not in the system memory, there may a need to fetch the metadata of the hash from the disk to verify if such a hash exists. It will be appreciated that metadata structures may consume most of system memory, e.g., DRAM, in the storage system, so that the metadata limits the total size of the storage system.

Figure 4:
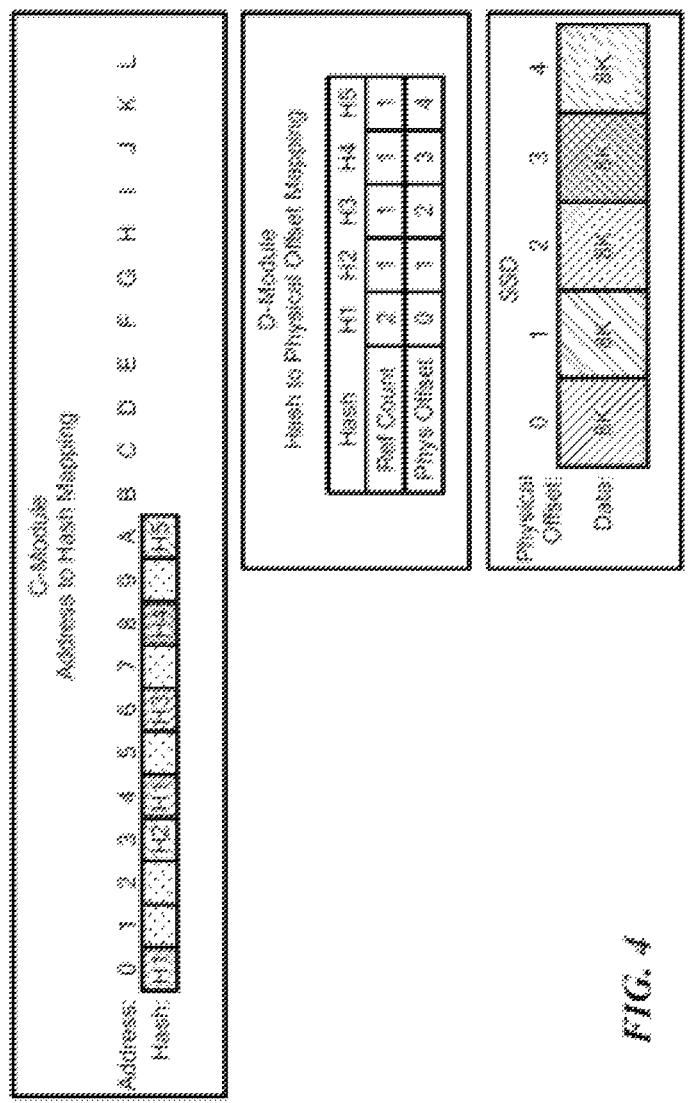
FIG. 4 is a schematic representation of address-to-hash (A2H) mapping in a control module and hash-to-physical (H2P) mapping in a data module for a content aware storage system.

FIG. 4 shows an example control or C module address to hash (A2H) mapping 400. As can be seen, as data blocks arrive, the content for the address is hashed to generate H1, H2, H3, H4, H5, as shown. It should be noted that H1 appears twice and is deduplicated. The D-module includes a hash to physical (H2P) mapping showing the physical offset of the data along with a reference count indicative of how many times a given hash value occurs. It will be appreciated that a particular hash value having a high reference count will likely be accessed more often than hash values having a low reference count. In embodiments, a reference count is incremented each time the hash value is generated in a volume. Thus, higher reference count hash values may be preferred for placement in D cache over low reference count hash values. It can be seen that the physical offset corresponds to the order in which a unique hash value is generated. For example, H3 is shown with an offset value of 2 since a second H1 value was deduplicated.

In embodiments, metadata and user data associated with IO processing in a storage system can be tiered between levels of storage media based on certain considerations. Three levels, or tiers, of storage are described in the embodiments: high tier storage, intermediate tier storage, and low tier storage. High tier storage provides faster access and retrieval but oftentimes comes with additional costs. Low tier storage offers the advantages of lower costs but typically increases the latency of IO processes. Intermediate tier storage offers slower retrieval than high tier storage but faster retrieval than low tier storage. Likewise, intermediate tier storage is less costly than high tier storage but is typically more costly than low tier storage. The embodiments herein describe high tier storage as RAM, intermediate tier storage as SCM, and low tier storage as SSD; however, it will be understood that other types of storage media that have similar properties of RAM, SCM, and SSD may be used to realize the advantages described herein.

As indicated above, embodiments described herein provide tiering of data between storage media in a content aware storage system. In the course of IO processes, the embodiments provide efficiencies in storage of IO data in terms of tiering between storage media based on factors, such as available high-tier memory and data access frequency. In addition, the embodiments described herein focus on techniques to leverage the low latency associated with intermediate tier storage, such as storage class memory (SCM); and the high degree of writes per day to lower the cost of all flash arrays by lowering the need for costly high tier storage, such as RAM, thereby allowing a system to provide less expensive, lower writes per day (WPD) for the arrays (e.g., by lowering the need for RAM and allowing for the use of less expensive, lower WPD for the storage backend).

In a content aware storage array, it is often assumed that all of the metadata resides in RAM. This is due to the frequent access to metadata and the dependence of the IO on the latency of accessing the metadata. If the metadata was stored on a flash storage, it could add hundreds of microseconds of latency to each IO processed. The embodiments described herein enable the demotion of colder (i.e., less accessed) parts of the metadata to intermediate storage, such as storage class memory (SCM), while maintaining the hottest metadata (i.e., most frequently accessed) in random access memory (RAM) based on a least recent used (LRU) method.

Figure 5:
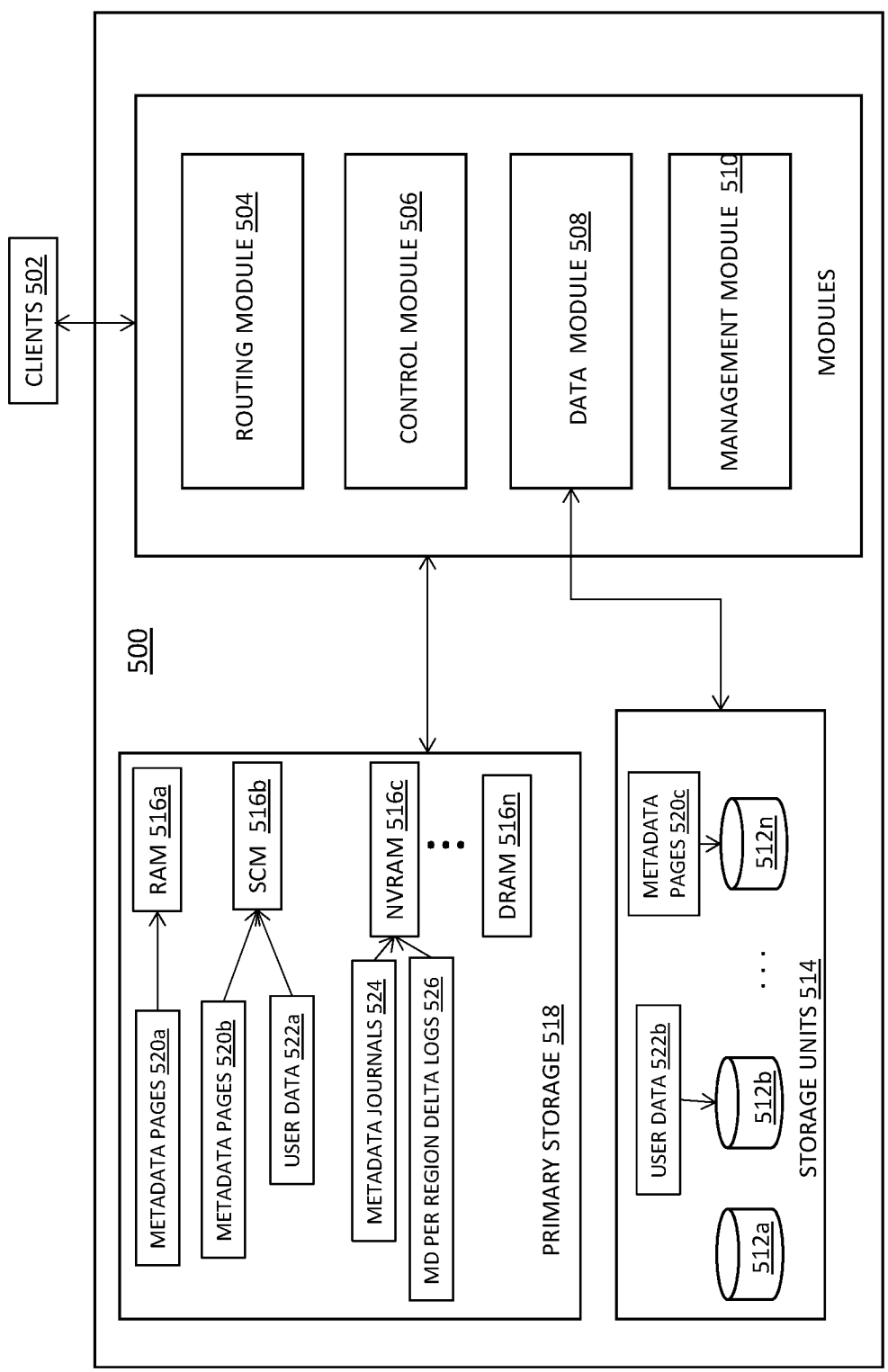
FIG. 5 is a simplified block diagram of a content aware system for providing tiering of data between storage media in accordance with an embodiment.

Turning now to FIG. 5, an example storage system 500 for tiering of data associated with I/O processing will now be described. In certain embodiments, storage system 500 is a content aware storage system and includes elements similar to the storage system 300 of FIG. 3 with certain modifications that are described herein. The storage system 500 includes modules referred to as a routing module 504, a control module 506, a data module 508, and a management module 510. The modules 504-510 may be the same as modules 302a-302d described in FIG. 3. In addition, the storage system 500 includes primary memory 518 and storage units 514. The primary memory 518 may be substantially similar to the primary memory 318, and the storage units 514 may be substantially similar to the storage units 306 of FIG. 3.

The primary memory 518 includes high tier storage and intermediate tier storage. The high-tier storage includes random access memory (RAM) 516a. An intermediate tier storage includes storage class memory (SCM) 516b. Other types of storage in the primary storage 518 include non-volatile random access memory (NVRAM), 516c, and DRAM 516n. These memory units 516a-516n may correspond at least in part to the memory units 316a-316n of FIG. 3. The storage units 514 refer to low tier storage and include storage elements 512a-512n, which may correspond to the storage devices 308a-308n of FIG. 3.

Clients 502 communicate with the storage system 500, e.g., through the routing module 504 to issue IO requests and related processing information. IO requests, such as read and write requests, may result in the creation of user data and metadata associated with the requests. As will be described further herein, metadata pages and copies thereof may be stored in the storage tiers of the system 500. The storage tiers include volatile and non-volatile storage. In embodiments, metadata pages are stored, e.g., in high tier storage and intermediate storage, such as one or more of memory units 516a-516b, as well as in low tier storage, such as one or more storage devices 512a-512n. As shown, e.g., in FIG. 5, metadata pages 520a-520c can be stored in RAM 516a (a high tier storage) and SCM 516b (an intermediate tier storage), as well as in storage devices 512a-512n (low tier storage). In particular, when a metadata page is created in response to a certain IO request, a first copy of the metadata page is stored in high tier storage, such as RAM 516a (e.g., as one of metadata pages 520a), a copy of the metadata page is stored in intermediate tier storage, such as SCM 516b (e.g., as one of metadata page 520b), and one or more additional copies of the metadata page are stored in low tier storage, such as one or more of storage devices 512a-512n (shown generally as metadata pages 520c). For example, two copies may be maintained in low tier storage to support RAID-6 resiliency level (i.e., two drive failures. For a RAID-5 resiliency level, a single copy of the metadata page may be sufficient to store in low tier storage.

In addition, user data corresponding to the IO request processing is stored in the storage system 500. The user data may be stored in low tier storage, such as one of storage devices 512a-512n (shown as user data 522b) or in intermediate tier storage (shown as user data 522a). Storing user data in low tier storage can result in latency of data retrieval but may lessen storage costs. Likewise, storing user data in high tier storage may result in faster data retrieval but could increase costs of storage.

As shown in FIG. 5, under certain conditions, some user data may be stored in SCM 516b as user data 522a, and other user data may stored in one or more storage devices 512-512n (e.g., user data 522b). The embodiments described herein enable tiering of metadata pages to lower tier storage based on the frequency of its access and the availability of space in the high tier storage. Metadata pages that are frequently accessed are considered to be "hot." The embodiments further enable tiering of user data from low tier storage to high tier storage based on the frequency in which the user data is accessed in the low tier storage.

The storage system 500 also includes metadata journals 524 and metadata per region delta logs 526. These journals and logs may be stored in high tier storage, e.g., in NVRAM 516c. The metadata journals 524 and the metadata per region delta logs 526 are described further herein.

These, and other aspects, of the data tiering between storage media will now be described in the flow diagrams of FIGS. 6-8.

Figure 6:
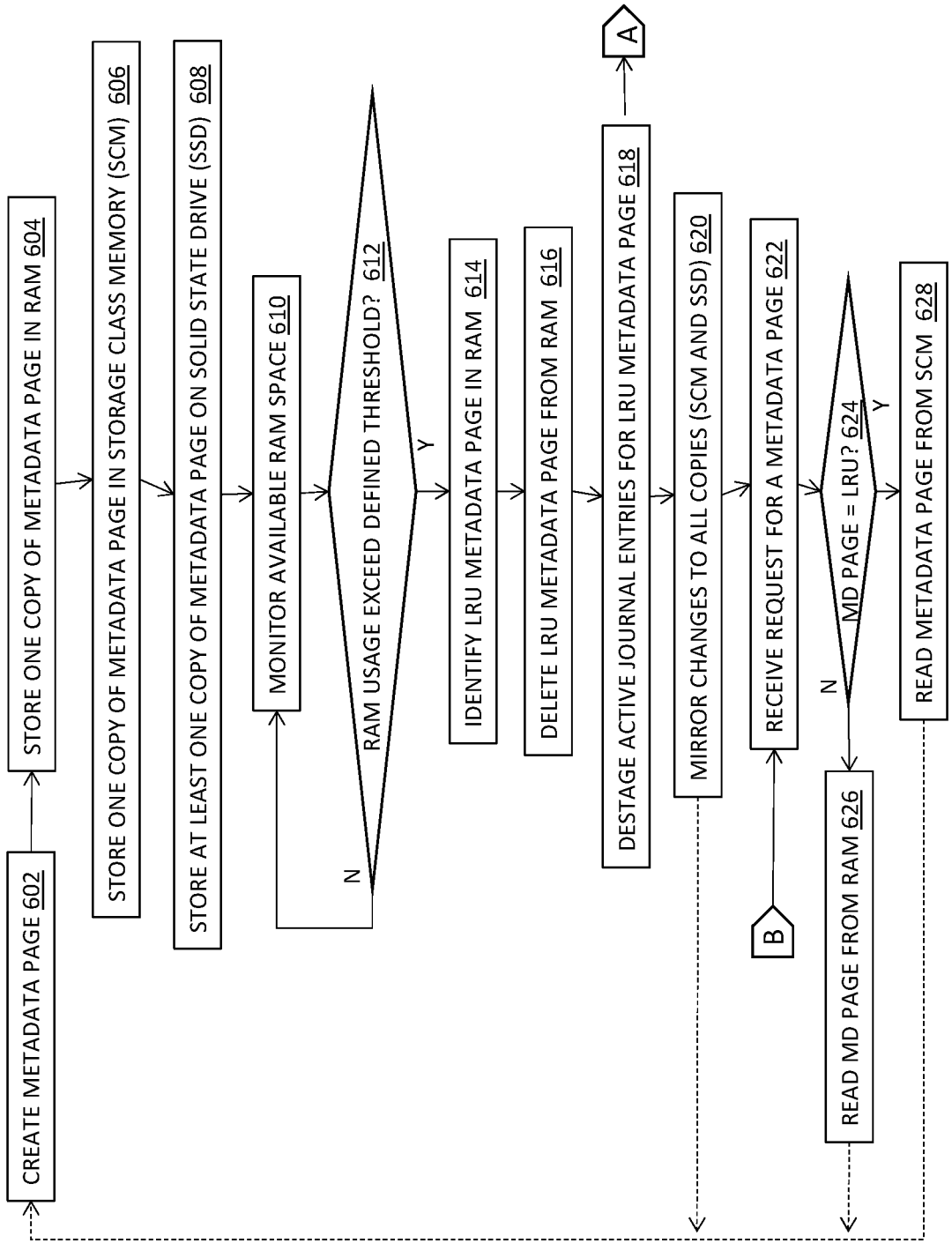
FIG. 6 is a flow diagram of a process for providing tiering of data between storage media in a content aware storage system in accordance with an embodiment.

Turning now to FIG. 6, a flow diagram 600 describing a process for tiering of data between storage media in a content aware storage system will now be described. For purposes of illustration, the embodiments utilize RAM as its high tier storage, SCM as its intermediate tier storage, and SSD as its low tier storage. However, it will be understood that other similar tiered storage media can be used to realize the advantages described herein.

In block 602, a metadata page is created in response to an IO request. In block 604, a first copy of the metadata page 520a is stored in RAM 516a, a second copy of the metadata page 520b is stored in SCM 516b in block 606, and a third copy of the metadata page 520c is stored in low tier storage, such as storage device 512n, which may be a solid state drive (SSD), in block 608.

In block 610, the system monitors available RAM space. For example, IO requests are received and processed, the system tracks the available memory in RAM 516a. A predefined usage threshold (e.g., 90% full) may be established and once the system determines RAM usage exceeds the threshold value, the process identifies from the metadata pages stored in RAM, which of the pages is least recently used (LRU) in block 614. In response to the monitoring in block 610, if the threshold value has not been met in block 612, the process returns to block 610 and the monitoring continues.

Returning to block 614, once the LRU metadata page has been identified, it is deleted from the RAM 516a in block 616. In block 618, the process destages active journal entries for the LRU metadata page in block 618. The journal provides the difference between the state of the system in RAM and the state of the system if it was recovered from disk. In the case of losing the RAM (e.g., power loss or node reboot), the system would need to read the system state from disk and reapply all the changes from the journal to recover to the system state. For example, suppose the reference count of hash XYZ is decreased from 5 to 4, so the state in the RAM will be XYZ:rc4, the state in the disk would be XYZ:rc5 and the state in the journal would be XYZ:rc4. When destaged, the state of the disk will become XYZ:rc4 and the journal entry may be removed. The process continues to block 620 in a one embodiment, and may alternatively continue to FIG. 7 in another embodiment.

In the first embodiment, the changes to the active journal entries are mirrored (also referred to as "hardened") to all remaining copies of the metadata page in block 620. Thus, the changes are mirrored to the metadata page 520b in the SCM 516b and the metadata page 520c in the storage devices 512n. The process described in blocks 602-620 can be repeated in a loop as new metadata pages are created.

In block 622, a request to read a metadata page is received at the system. The process identifies the metadata page and determines whether the requested page is the LRU page in block 624. The metadata page may have a hash table of pages (or similar structure) resident in RAM. If the page is not there, it will need to read from disk. If not, this means that the metadata page is still in RAM (i.e., has not been tiered to the SCM) and the process reads the requested page from RAM in block 626. If, however, the requested page is determined to be the same as the LRU metadata page in block 624, the process reads the metadata page from the SCM in block 628, as the metadata page has been previously deleted from RAM.

It will be understood that the process of FIG. 6 in blocks 602-628 can be repeated in a loop as new metadata pages are created, as indicated by dashed lines from blocks 626/628 to block 602.

Returning to block 618, in the second embodiment, the process does not mirror the changes to the active journal entries to all three metadata page copies (as described in block 620 of process 600). Instead, the system maintains a per region delta log 526 for the lower tier storage devices 512a-512n in block 702, and the changes from process 600 are mirrored only to the metadata page in the SCM in block 704. The delta log may be an on-disk journal. When something is written from RAM to the copy on SCM, all of the changes that were written are accumulated until a specified level of amortization is realized (e.g., there are sufficient changes to warrant a write to lower tier) and the system then writes the changes.

An amortization threshold value is established with respect to the metadata pages. In block 706, the process 700 monitors the amortization of activities for the metadata pages. The amortization refers to a frequency in which a metadata page is written to. In block 708, it is determined, in response to the monitoring in block 706, whether the amortization threshold value has been reached. If not, the activities continue to be monitored in block 706. Otherwise, if the threshold is reached for the metadata page in block 708, all of changes with respect to the metadata page that have been tracked in the delta log 526 are written from the log 526 to the corresponding metadata pages in the low tier storage in block 710. The process 700 returns to block 622 of FIG. 6 when a read request is received. The process 700 enables more frequent writes to the SCM and not as many to the lower tier storage, which provides lower latency on read activities and reduces the umber of metadata writes to lower tier storage.

Turning now to FIG. 8, the embodiments herein provide for tiering of user data between low tier storage and high tier storage. In block 802, user data from an IO request is stored in low tier storage, such as one of storage devices 512a-512n. The process 800 monitors ongoing read activity for the user data at the low tier storage in block 804. In particular, a read frequency threshold value may be set for a given set of user data. When a read request for the user data is received in block 806, the user data is read from the low tier storage in block 808 and the process 800 returns to block 804. In block 810, it is determined whether the read activity threshold has been met. If not, the process 800 returns to block 804 and the ongoing read activity for the user data continues to be monitored. Otherwise, if the activity exceeds the threshold value in block 810, the user data is copied to a higher tier storage, such as the SCM 516b. The existing user data that was recently copied is maintained in the lower tier storage, e.g., storage unit 512n. The copy of the user data moved to the higher tier storage is marked in cache in block 814. A cache (e.g., one of the units in primary memory 518) is maintained for the SCM up-tiered pages. The cache is addressed by hash handles and needs to be invalidated if a hash handle is reallocated or destroyed. Thus, a hash handle that has a disk copy can also point to a RAM entry or SCM cache entry. For user data, the high tier is more of a cache than an actual tier. In this way, the user data can be kept in the higher tier that is not protected by RAID and the more of the higher tier can be utilized for low latency read cache.

In block 816, a request for user data is received. In block 818, the process 800 determines if the user data is in the higher tier storage, e.g., SCM. If so, the user data is read from the higher tier storage in block 820. Otherwise, the copy of the user data stored in the low tier storage is read in block 808. Thus, as new user data is received, it is initially written to low tier storage. In response to monitoring read activities over time, the user data can be tiered to a higher tier storage if it is determined from the monitoring that the read access for the user data increases to a threshold level.

FIG. 9 shows an exemplary computer 900 (e.g., physical or virtual) that can perform at least part of the processing described herein. The computer 900 includes a processor 902, a volatile memory 904, a non-volatile memory 906 (e.g., hard disk or flash), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

We claim:

1. A method for tiering data between storage media in a content aware storage system, comprising:
    for each metadata page of a plurality of metadata pages in the content aware storage system:
        storing a first copy of the metadata page in a high tier storage;
        storing a second copy of the metadata page in an intermediate tier storage; and
        storing a third copy of the metadata page in low tier storage;
    maintaining a per region delta log for changes to the active journal entries of the metadata pages in the low tier storage;
    upon determining, in response to monitoring available space in the high tier storage, usage of the high tier storage exceeds a threshold value:
        identifying a least recently used (LRU) metadata page of the plurality of metadata pages;
        deleting the LRU metadata page from the high tier storage; and
        destaging active entries of a metadata journal for the LRU metadata page;
    receiving a request to read one of the plurality of metadata pages; and
    upon determining the one of the plurality of metadata pages is the LRU metadata page that was deleted from the high tier storage, reading the one of the plurality of metadata pages from the intermediate tier storage.

2. The method of claim 1, further comprising:
    upon determining the one of the plurality of metadata pages is not the LRU metadata page, reading the one of the plurality of metadata pages from the high tier storage.

3. The method of claim 1, wherein destaging the active entries of the metadata journal for the LRU metadata page includes writing changes corresponding to the active entries to second and third copies of the LRU metadata page.

4. The method of claim 1, wherein destaging the active entries of the metadata journal for the LRU metadata page includes writing changes corresponding to the active entries only to a second copy of the LRU metadata page, the method further comprising:
    monitoring amortization of write activities of the metadata pages; and
    upon determining a threshold value of the amortization has been reached for one of the metadata pages in the low tier storage, writing the changes from the per region delta log with respect to the one of the metadata pages to the corresponding one of the metadata pages in the low tier storage.

5. The method of claim 1, further comprising:
    writing user data corresponding to the metadata page of the plurality of metadata pages to the low tier storage;
    upon determining read activity for the metadata page has exceeded a threshold frequency value:
        copying the user data to the intermediate tier storage;
        maintaining an existing copy of the user data in the low tier storage; and
        marking a copy of the user data in the intermediate tier storage in cache; and
    upon receiving a request to read the user data, reading the copy of the user data from the intermediate tier storage.

6. The method of claim 5, further comprising:
    upon determining the read activity for the metadata page has not reached or exceeded the threshold frequency value, reading a copy of the user data from the low tier storage.

7. The method of claim 6, wherein the high tier storage is random access memory, the intermediate storage is storage class memory, and the low tier storage is a solid state drive.

8. A system for tiering data between storage media, the system comprising:
    a memory comprising computer-executable instructions; and
    a processor operable by a storage system, the processor executing the computer-executable instructions, the computer-executable instructions when executed by the processor cause the processor to perform operations comprising:
    for each metadata page of a plurality of metadata pages in a content aware storage system:
        storing a first copy of the metadata page in a high tier storage;
        storing a second copy of the metadata page in an intermediate tier storage; and
        storing a third copy of the metadata page in low tier storage;
    maintaining a per region delta log for changes to the active journal entries of the metadata pages in the low tier storage;
    upon determining, in response to monitoring available space in the high tier storage, usage of the high tier storage exceeds a threshold value:
        identifying a least recently used (LRU) metadata page of the plurality of metadata pages;
        deleting the LRU metadata page from the high tier storage; and
        destaging active entries of a metadata journal for the LRU metadata page;
    receiving a request to read one of the plurality of metadata pages; and
    upon determining the one of the plurality of metadata pages is the LRU metadata page that was deleted from the high tier storage, reading the one of the plurality of metadata pages from the intermediate tier storage.

9. The system of claim 8, wherein the operations further comprise:
upon determining the one of the plurality of metadata pages is not the LRU metadata page, reading the one of the plurality of metadata pages from the high tier storage.

10. The system of claim 8, wherein destaging the active entries of the metadata journal for the LRU metadata page includes writing changes corresponding to the active entries to second and third copies of the LRU metadata page.

11. The system of claim 8, wherein destaging the active entries of the metadata journal for the LRU metadata page includes writing changes corresponding to the active entries only to a second copy of the LRU metadata page, the operations further comprising:
monitoring amortization of write activities of the metadata pages; and
upon determining a threshold value of the amortization has been reached for one of the metadata pages in the low tier storage, writing the changes from the per region delta log with respect to the one of the metadata pages to the corresponding one of the metadata pages in the low tier storage.

12. The system of claim 8, wherein the operations further comprise:
writing user data corresponding to the metadata page of the plurality of metadata pages to the low tier storage;
upon determining read activity for the metadata page has exceeded a threshold frequency value:
copying the user data to the intermediate tier storage;
maintaining an existing copy of the user data in the low tier storage; and
marking a copy of the user data in the intermediate tier storage in cache; and
upon receiving a request to read the user data, reading the copy of the user data from the intermediate tier storage.

13. The system of claim 12, wherein the operations further comprise:
upon determining the read activity for the metadata page has not reached or exceeded the threshold frequency value, reading a copy of the user data from the low tier storage.

14. The system of claim 13, wherein the high tier storage is random access memory, the intermediate storage is storage class memory, and the low tier storage is a solid state drive.

15. A computer program product embodied on a non-transitory computer readable medium, the computer program product including instructions that, when executed by a computer, causes the computer to perform operations comprising:
for each metadata page of a plurality of metadata pages in a content aware storage system:
storing a first copy of the metadata page in a high tier storage;
storing a second copy of the metadata page in an intermediate tier storage; and
storing a third copy of the metadata page in low tier storage;
maintaining a per region delta log for changes to the active journal entries of the metadata pages in the low tier storage;

upon determining, in response to monitoring available space in the high tier storage, usage of the high tier storage exceeds a threshold value:
identifying a least recently used (LRU) metadata page of the plurality of metadata pages;
deleting the LRU metadata page from the high tier storage; and
destaging active entries of a metadata journal for the LRU metadata page;
receiving a request to read one of the plurality of metadata pages; and
upon determining the one of the plurality of metadata pages is the LRU metadata page that was deleted from the high tier storage, reading the one of the plurality of metadata pages from the intermediate tier storage.

16. The computer program product of claim 15, wherein the operations further comprise:
upon determining the one of the plurality of metadata pages is not the LRU metadata page, reading the one of the plurality of metadata pages from the high tier storage.

17. The computer program product of claim 15, wherein destaging the active entries of the metadata journal for the LRU metadata page includes writing changes corresponding to the active entries to second and third copies of the LRU metadata page.

18. The computer program product of claim 15, wherein destaging the active entries of the metadata journal for the LRU metadata page includes writing changes corresponding to the active entries only to a second copy of the LRU metadata page, the operations further comprising:
monitoring amortization of write activities of the metadata pages; and
upon determining a threshold value of the amortization has been reached for one of the metadata pages in the low tier storage, writing the changes from the per region delta log with respect to the one of the metadata pages to the corresponding one of the metadata pages in the low tier storage.

19. The computer program product of claim 15, wherein the operations further comprise:
writing user data corresponding to the metadata page of the plurality of metadata pages to the low tier storage;
upon determining read activity for the metadata page has exceeded a threshold frequency value:
copying the user data to the intermediate tier storage;
maintaining an existing copy of the user data in the low tier storage; and
marking a copy of the user data in the intermediate tier storage in cache; and
upon receiving a request to read the user data, reading the copy of the user data from the intermediate tier storage.

20. The computer program product of claim 19, wherein the operations further comprise:
upon determining the read activity for the metadata page has not reached or exceeded the threshold frequency value, reading a copy of the user data from the low tier storage; and
wherein the high tier storage is random access memory, the intermediate storage is storage class memory, and the low tier storage is a solid state drive.

* * * * *